United States Patent
Chiang et al.

(10) Patent No.: US 11,138,303 B2
(45) Date of Patent: Oct. 5, 2021

(54) ELECTRONIC DEVICE WITH FINGERPRINT SENSING FUNCTION AND FINGERPRINT IMAGE PROCESSING METHOD

(71) Applicant: Egis Technology Inc., Taipei (TW)

(72) Inventors: Yuan-Lin Chiang, Taipei (TW); Yu-Chun Cheng, Taipei (TW); Yong-Huai Huang, Taipei (TW)

(73) Assignee: Egis Technology Inc., Taipei (TW)

( * ) Notice: Subject to any disclaimer, the term of this patent is extended or adjusted under 35 U.S.C. 154(b) by 44 days.

(21) Appl. No.: 16/578,423

(22) Filed: Sep. 23, 2019

(65) Prior Publication Data

US 2020/0175142 A1    Jun. 4, 2020

Related U.S. Application Data

(60) Provisional application No. 62/773,196, filed on Nov. 30, 2018.

(30) Foreign Application Priority Data

Sep. 3, 2019 (CN) .......................... 201910825652.1

(51) Int. Cl.
  *G06F 21/32*  (2013.01)
  *G06F 3/0488* (2013.01)
  *G06K 9/00*   (2006.01)

(52) U.S. Cl.
  CPC ............ *G06F 21/32* (2013.01); *G06F 3/0488* (2013.01); *G06K 9/00026* (2013.01); *G06K 9/00073* (2013.01); *G06F 2203/0338* (2013.01)

(58) Field of Classification Search
  CPC .................. G06F 21/32; G06F 3/0488; G06F 2203/0338; G06K 9/00026; G06K 9/00073; G06K 9/40; G06K 9/00067; G06K 9/00013; G01K 13/00
  See application file for complete search history.

(56) References Cited

U.S. PATENT DOCUMENTS

| 9,704,015 | B2 | 7/2017 | Wang |
| 2015/0022670 | A1* | 1/2015 | Gozzini ............... G06K 9/0002 348/187 |
| 2017/0140233 | A1* | 5/2017 | Andersson ........... G06K 9/0002 |
| 2020/0074134 | A1* | 3/2020 | Lim ........................ G06K 9/03 |

FOREIGN PATENT DOCUMENTS

| CN | 107820618 | | 3/2018 | |
| CN | 108064386 | | 5/2018 | |
| KR | 20200027328 | A * | 3/2020 | ........... G06K 9/0002 |
| TW | I626596 | | 6/2018 | |

* cited by examiner

*Primary Examiner* — Premal R Patel
(74) *Attorney, Agent, or Firm* — JCIPRNET

(57) ABSTRACT

An electronic device with a fingerprint sensing function and a fingerprint image processing method are provided. The electronic device includes a processor, a fingerprint sensor, and a temperature sensor. The fingerprint sensor is coupled to the processor. The fingerprint sensor is configured to obtain a current fingerprint image. The temperature sensor is coupled to the processor. The temperature sensor is configured to obtain current temperature information. The processor obtains current background noise according to the current temperature information, and removes the background noise from the current fingerprint image to generate a corrected fingerprint image.

12 Claims, 4 Drawing Sheets

ELECTRONIC DEVICE WITH FINGERPRINT SENSING FUNCTION AND FINGERPRINT IMAGE PROCESSING METHOD

CROSS-REFERENCE TO RELATED APPLICATION

This application claims the priority benefits of U.S. provisional application Ser. No. 62/773,196, filed on Nov. 30, 2018, and China application serial no. 201910825652.1, filed on Sep. 3, 2019. The entirety of each of the above-mentioned patent applications is hereby incorporated by reference herein and made a part of this specification.

BACKGROUND

Technical Field

The present invention relates to a sensing technology, in particular, to an electronic device with a fingerprint sensing function and a fingerprint image processing method.

Description of Related Art

In recent years, the fingerprint sensing technology has been widely applied to various electronic devices to provide various identity registration or identity verification functions, and the current fingerprint sensors are roughly classified into optical fingerprint sensors and capacitive fingerprint sensors. However, the common fingerprint sensing has the problems that, whether an optical fingerprint sensor or a capacitive fingerprint sensor is used to obtain a fingerprint image, the fingerprint sensor is affected by background noise in the process of capturing the fingerprint image, so the captured fingerprint image includes background noise. When the signal intensity of the background noise in the fingerprint image is too high, subsequent fingerprint recognition is prone to errors or wrong recognition. In view of this, solutions of several embodiments will be proposed below.

SUMMARY

The present invention is directed to an electronic device with a fingerprint sensing function and a fingerprint sensing method, which can obtain a fingerprint image in good quality with no background noise.

According to an embodiment of the present invention, an electronic device with a fingerprint sensing function according to the present invention includes a processor, a fingerprint sensor, and a temperature sensor. The fingerprint sensor is coupled to the processor. The fingerprint sensor is configured to obtain a current fingerprint image. The temperature sensor is coupled to the processor. The temperature sensor is configured to obtain current temperature information. The processor obtains current background noise according to the current temperature information, and removes the background noise from the current fingerprint image according to the current background noise to generate a corrected fingerprint image.

According to an embodiment of the present invention, a fingerprint image processing method of the present invention is applicable to an electronic device with a fingerprint sensing function. The electronic device includes a processor, a fingerprint sensor, and a temperature sensor. The fingerprint image processing method includes the following steps: obtaining, by the fingerprint sensor, a current fingerprint image; obtaining, by the temperature sensor, current temperature information; obtaining, by the processor, current background noise according to the current temperature information; and removing the background noise from the current fingerprint image according to the current background noise to generate a corrected fingerprint image.

Based on the above, the electronic device with a fingerprint sensing function and the fingerprint sensing method according to the present invention can obtain corresponding current background noise according to the current temperature during the current fingerprint sensing operation, and perform image processing on the current fingerprint image and the current background noise to remove the background noise to obtain a fingerprint image in good image quality with no background noise.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
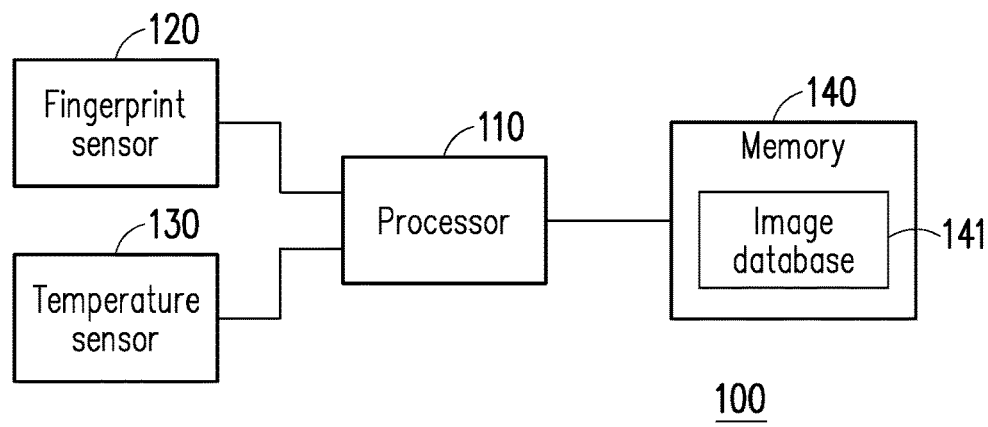
FIG. 1 is a schematic diagram of an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an electronic device with a fingerprint sensing function according to an embodiment of the present invention. Referring to FIG. 1, the electronic device 100 includes a processor 110, a fingerprint sensor 120, a temperature sensor 130, and a memory 140. The processor 110 is coupled to the fingerprint sensor 120, the temperature sensor 130, and the memory 140. The processor 110 may obtain a fingerprint image and temperature information through the fingerprint sensor 120 and the temperature sensor 130, and store the fingerprint image into the memory 140 together with the corresponding temperature information. In the present embodiment, the processor 110 may be a central processing unit (CPU), a digital signal processor (DSP), or other processors with image processing capability and data computing capability. The fingerprint sensor 120 may be an optical fingerprint sensor or a capacitive fingerprint sensor.

Specifically, when the electronic device 100 performs a fingerprint sensing operation, the processor 110 drives the fingerprint sensor 120 to obtain a current fingerprint image and drives the temperature sensor 130 to obtain current temperature information under the current fingerprint sensing operation, and marks the current fingerprint image with the current temperature information. In an embodiment, the current temperature information may be, for example, an ambient temperature of the electronic device 100 or, for example, a battery temperature of the electronic device 100. In the present embodiment, the processor 110 stores the marked current fingerprint image into the memory 140, and checks whether the number of original fingerprint images stored in the memory 140 corresponding to the current temperature information and corresponding to the same fingerprints is greater than or equal to a predetermined number; when the number of the original fingerprint images stored in the memory 140 is greater than or equal to the predetermined number, one of the following two ways may be adopted to obtain the current background noise: extracting the current background noise from a plurality of original fingerprint images stored in the memory 140; and getting the current background noise by a default prediction model.

However, it should be noted that the background noise in the present embodiment refers to unknown grains or unknown spots caused by noise in the sensed image outputted by the image sensor, and the presence of the background noise may affect the quality of the sensed image. Moreover, the current background noise of the present embodiment refers to a pure noise image that does not include fingerprint information. In other words, the current background noise of the present embodiment may be equivalent to a sensed image with only noise interference sensed by the fingerprint sensor 120 when the fingerprint sensor 120 does not receive external signals, for example, when no finger or other objects is placed on the sensing surface of the fingerprint sensor 120.

Figure 2:
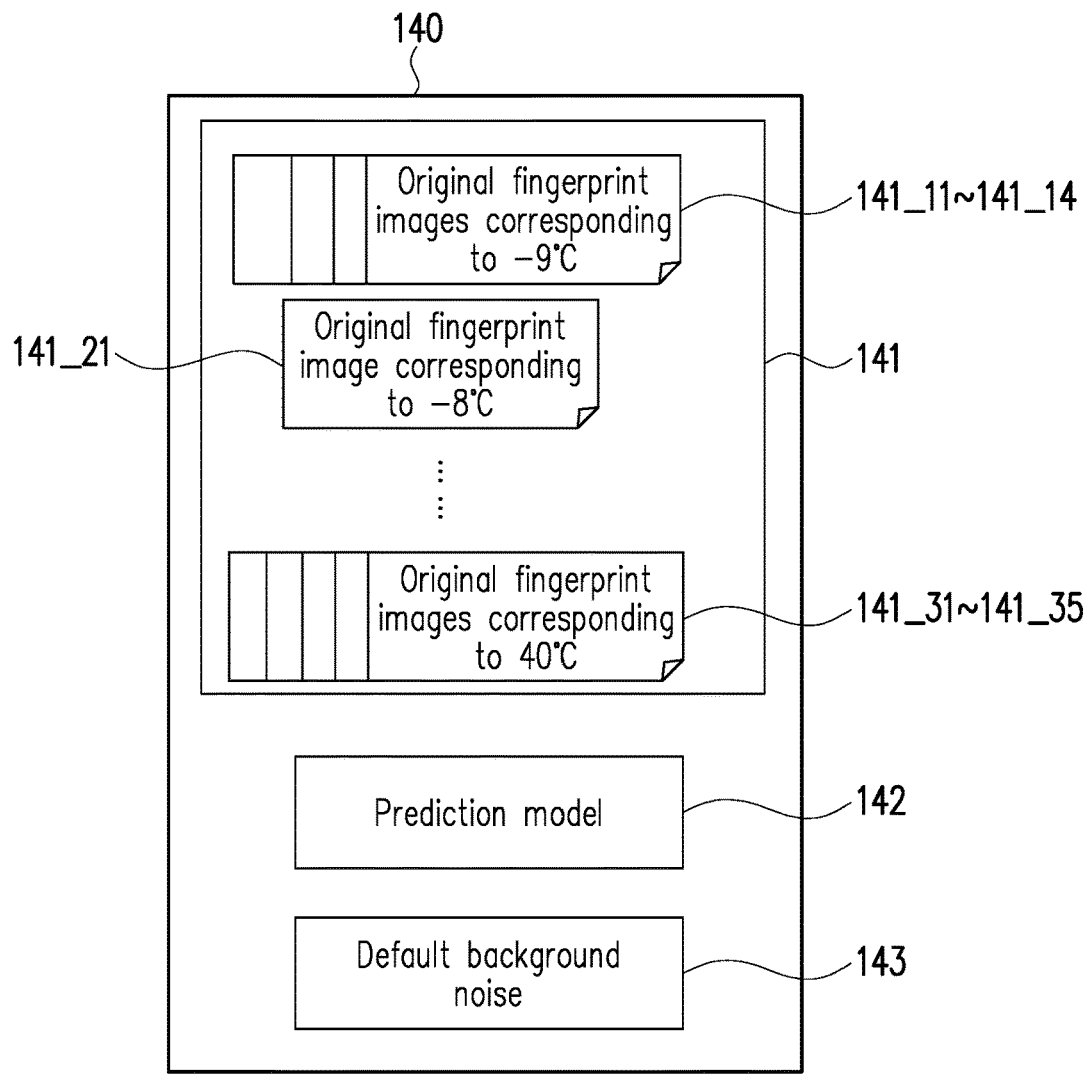
FIG. 2 is a schematic diagram of an image database according to an embodiment of the present invention.

FIG. 2 is a schematic diagram of an image database according to an embodiment of the present invention. Referring to FIG. 1 and FIG. 2, the memory 140 stores an image database 141, a prediction model 142, and a default background noise 143. The image database 141 may include a plurality of original fingerprint image groups corresponding to different temperature conditions, and the plurality of original fingerprint image groups include one or more original fingerprint images. Moreover, all of the original fingerprint images in the plurality of original fingerprint image groups in the present embodiment are a plurality of original fingerprint images corresponding to a same fingerprint.

In the present embodiment, the default background noise 143 and the prediction model 142 are built in the memory 140 before the electronic device 100 leaves the factory. The prediction model 142 may include, for example, a predetermined function, which is a function between background noise intensity and temperature, and this function can be obtained through machine learning by analyzing a large amount of fingerprint image sample data, but the present invention is not limited thereto. Moreover, the default background noise 143 refers to a sensed image with only noise interference sensed by the fingerprint sensor 120 before leaving the factory at certain temperature under the situation that no finger or other object is placed on the sensing surface of the fingerprint sensor 120.

For example, the original image database 141 includes, for example, a plurality of original fingerprint image groups, and each of the plurality of original fingerprint image groups may include one or more original fingerprint images corresponding to a same temperature condition. In FIG. 2, the original image database 141 may, for example, include three original fingerprint image groups. The first original fingerprint image group includes three original fingerprint images 141_11 to 141_13 corresponding to −9° C. The second original fingerprint image group includes one original fingerprint image 141_21 corresponding to −8° C. And the third original fingerprint image group includes five original fingerprint images 141_31 to 141_35 corresponding to 40° C. Wherein, in the present embodiment, the original fingerprint images of the original fingerprint image groups correspond to the same fingerprint (the same fingerprint feature). However, when the electronic device 100 performs fingerprint sensing at −9° C., the processor 110 obtains a current fingerprint image via the fingerprint sensor 120, and obtains corresponding current temperature information via the temperature sensor 130. Then, the processor 110 marks the current fingerprint image with the current temperature information, and stores the current fingerprint image as an original fingerprint image 141_14 corresponding to −9° C. to the image database 141. Thus, the image database 141 then includes four original fingerprint images corresponding to −9° C. Next, the processor 110 checks whether the number of the original fingerprint images corresponding to −9° C. is greater than or equal to a predetermined number. If the predetermined number is 4, then the processor 110 will perform image processing according to the four original fingerprint images corresponding to −9° C. to obtain current background noise.

As another example, in FIG. 2, the original image database 141 may, for example, include two original fingerprint image groups. The first original fingerprint image group includes four original fingerprint images corresponding to −9° C. 141_11 to 141_14. The second original fingerprint image group includes five original fingerprint images corresponding to 40° C. 141_31 to 141_35. Moreover, the original fingerprint images of the original fingerprint image groups correspond to the same fingerprint (the same fingerprint feature). When the electronic device 100 performs fingerprint sensing at −8° C., the processor 110 obtains a fingerprint image via the fingerprint sensor 120, and obtains corresponding current temperature information via the temperature sensor 130. Then, the processor 110 marks the current fingerprint image with the current temperature information, and stores the current fingerprint image as an original fingerprint image corresponding to −8° C. 141_21 to the image database 141 to add an original fingerprint image group corresponding to −8° C. Thus, the image database 141 then includes one original fingerprint image corresponding to −8° C. Next, the processor 110 checks whether the number of the original fingerprint images corresponding to −8° C. is greater than or equal to a predetermined number. If the predetermined number 4, then the processor 110 determines that the number of the original fingerprint images corresponding to −8° C. stored in the image database 141 is insufficient for image processing. Then, the processor 110 reads the prediction model 142 to substitute the current temperature information and the default background noise 143 into the function of the prediction model 142 so as to produce current background noise.

On the other hand, because the image database 141 of the present embodiment stores the fingerprint image obtained by each fingerprint sensing operation to continuously update the image database 141, if the storage space of the image database 141 is full, the processor 110 accumulates data of all fingerprint images and compresses the data to reduce the required storage space. The data compression is, for example, multiplying the signal value by 75% to obtain fingerprint image data compressed to 75% weight.

In another embodiment, the processor 110 may directly substitute the current temperature information and the default background noise 143 into the function of the prediction model 142 to obtain current background noise predicted using the prediction model 142 without checking the number of the original fingerprint images in the image database, so the original fingerprint images do not need to be stored.

Figure 3:
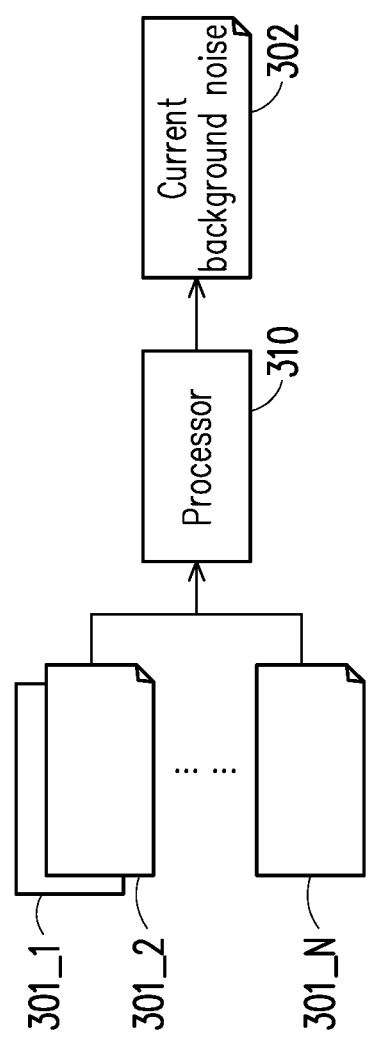
FIG. 3 is a schematic diagram of obtaining a current background image according to an embodiment of the present invention.

FIG. 3 is a schematic diagram of obtaining a current background image according to an embodiment of the present invention. Referring to FIG. 3, in the present embodiment, when the image database stores enough original fingerprint images, the processor 310 may read the image database to obtain a plurality of original fingerprint images 301_1 to 301_N corresponding to the current temperature information, where N is a positive integer more than zero. In the present embodiment, the processor 310 performs image processing on the original fingerprint images 301_1 to 301_N to obtain current background noise. The image processing includes grey-scale value accumulation, grey-scale value averaging, and grey-scale value selection. In detail, the processor 310 first performs grey-scale value accumulation to accumulate grey-scale values of mutually corresponding pixels of the original fingerprint images 301_1 to 301_N. Next, the processor 310 performs grey-scale value averaging to average the accumulated results of the grey-scale values corresponding to the pixels to obtain an average image. Then, the processor 110 performs grey-scale value selection to obtain current background noise 302 according to the grey-scale values of the pixels higher than a first grey-scale value threshold or lower than a second grey-scale value threshold in the average image.

In other words, the background noise in the fingerprint image usually has grey-scale values abnormally higher or lower than those of a common normal fingerprint image, and the original fingerprint images 301_1 to 301_N corresponding to the same temperature condition have similar background noise, so the original fingerprint images 301_1 to 301_N can obtain the current background noise 302 corresponding to the current temperature information after accumulation, averaging and selection (i.e., to remove the grey-scale values of the common normal fingerprint image) of the grey-scale values. Therefore, the processor 310 of the present embodiment may remove the background noise from the current fingerprint image currently obtained to generate a corrected (i.e., after the background noise is removed) fingerprint image in good image quality.

Figure 4:
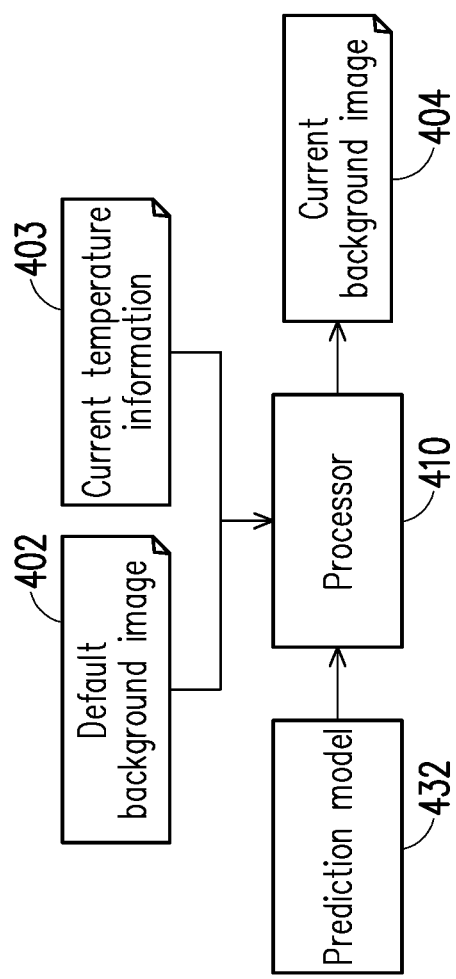
FIG. 4 is a schematic diagram of obtaining a current background image according to another embodiment of the present invention.

FIG. 4 is a schematic diagram of obtaining a current background image according to another embodiment of the present invention. Referring to FIG. 4, in the present embodiment, when the number of the original fingerprint images stored in the image database is insufficient, the processor 410 inputs the default background noise 402 and the current temperature information 403 to the prediction model 432 to obtain current background noise 404 corresponding to the current temperature information. In detail, the background noise intensities of the fingerprint images sensed at different temperatures are different and, for example, vary from 0.9 times to 1.1 times. As described above, the prediction model 432 is constructed by operation of machine learning. By substituting the default background noise 402 and the current temperature information 403 into the function of the prediction model 432, the current background noise 404 that conforms to the background noise intensity corresponding to the current temperature can be predicted. Therefore, the processor 410 may remove the background noise from the obtained current fingerprint image to generate a corrected (background noise removed) fingerprint image in good image quality.

In another embodiment, the processor 410 may directly input the default background noise 402 and the current temperature information 403 into the prediction model 432 to obtain the current background noise 404 corresponding to the current temperature information without pre-checking the number of the original fingerprint images in the image database, so the original fingerprint images do not need to be stored.

Figure 5:
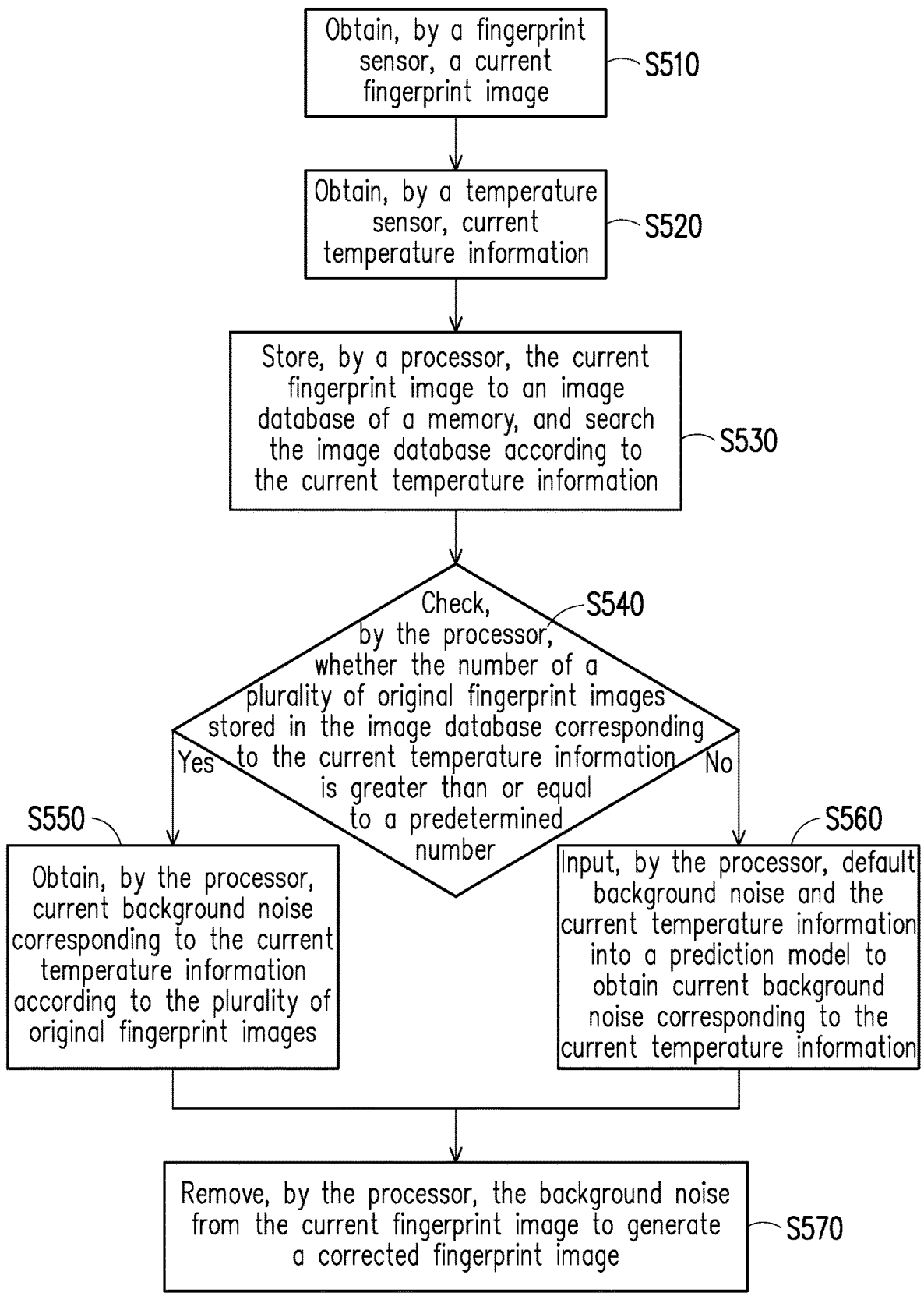
FIG. 5 is a schematic diagram of a fingerprint sensing method according to an embodiment of the present invention.

FIG. 5 is a schematic diagram of a fingerprint sensing method according to an embodiment of the present invention. Referring to FIG. 5, the fingerprint sensing method of the present embodiment can be applied to at least the electronic device 100 of the embodiment of FIG. 1 to cause the electronic device 100 to perform steps S510-570. The electronic device 100 includes a processor 110, a fingerprint sensor 120, a temperature sensor 130, and a memory 140. In step S510, the processor 110 obtains a current fingerprint image through the fingerprint sensor 120. In step S520, the processor 110 obtains current temperature information through the temperature sensor 130. That is, when the fingerprint sensor 120 senses the current fingerprint image, the processor 110 obtains an ambient temperature of the electronic device 100 or a battery temperature of the electronic device 100 through the temperature sensor 130 simultaneously. In step S530, the processor 110 stores the current fingerprint image to an image database 141 of the memory 140, and searches the image database 141 according to the current temperature information.

In step S540, the processor 110 checks whether the number of a plurality of original fingerprint images stored in the image database 141 corresponding to the current temperature information is greater than or equal to a predetermined number. If yes, the processor 110 performs step S550. In step S550, the processor 110 obtains current background noise corresponding to the current temperature information according to the plurality of original fingerprint images. If no, the processor 110 performs step S560. In step S560, the processor 110 inputs the default background noise and the current temperature information into a prediction model to obtain current background noise corresponding to the current temperature information. In step S570, the processor 110 removes the background noise from the current fingerprint image according to the current background noise to generate a corrected fingerprint image. Therefore, the fingerprint sensing method of the present embodiment can obtain the current background noise corresponding to the current temperature, so as to effectively remove the background noise from the fingerprint image. The corrected (after the background noise is removed) fingerprint image has good image quality.

In the fingerprint sensing method of another embodiment, steps S530, S540, and S550 are not needed. That is, after steps S510 and S520, the processor 110 directly performs step S560 to input the default background noise and the current temperature information into a prediction model to obtain the current background noise corresponding to the current temperature information.

In addition, for other internal component features, implementations, and technical details of the electronic device 100 with a fingerprint sensing function according to the present example, reference may be made to the descriptions of the embodiments of FIG. 1 to FIG. 4 to obtain sufficient teaching, suggestion, and implementation instructions, so the descriptions thereof are omitted herein.

Based on the above, the electronic device with a fingerprint sensing function and the fingerprint sensing method according to the present invention can obtain corresponding current background noise according to the current temperature information. The electronic device can directly obtain the current background noise by using the pre-established prediction model according to the current temperature information. The electronic device may also have an image database. When the number of corresponding original fingerprint images in the image database of the electronic device is sufficient for calculation to obtain current background noise, the electronic device may perform the image processing on the plurality of original fingerprint images to obtain current background noise. However, when the number of corresponding original fingerprint images in the image database of the electronic device is insufficient for calculation to obtain current background noise, the electronic device obtains the current background noise by using the pre-established prediction model. Moreover, the electronic device of the present invention can store the original fingerprint image obtained by each fingerprint sensing into the image database to continuously increase the data volume of the original fingerprint images. Therefore, the electronic device with a fingerprint sensing function and the fingerprint sensing method according to the present invention can obtain a fingerprint image in good quality with no background noise, and have the function of automatically updating the image database.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. An electronic device with a fingerprint sensing function, comprising:
    a processor;
    a fingerprint sensor, coupled to the processor for obtaining a current fingerprint image;
    a temperature sensor, coupled to the processor for obtaining current temperature information; and
    a memory, coupled to the processor for storing an image database,
    wherein the fingerprint sensor is an optical fingerprint sensor or a capacitive fingerprint sensor,
    wherein the processor obtains current background noise according to the current temperature information, and removes the background noise from the current fingerprint image according to the current background noise through image processing to generate a corrected fingerprint image,
    wherein the processor stores the current fingerprint image to the image database of the memory,
    wherein the processor searches the image database according to the current temperature information, and when the processor determines that the number of a plurality of original fingerprint images stored in the image database corresponding to the current temperature information is greater than or equal to a predetermined number, the processor obtains the current background noise corresponding to the current temperature information according to the plurality of original fingerprint images.

2. The electronic device according to claim 1, wherein the processor performs image processing on the plurality of original fingerprint images to obtain the current background noise, the image processing comprising grey-scale value accumulation, grey-scale value averaging, and grey-scale value selection.

3. The electronic device according to claim 2, wherein the processor accumulates grey-scale values of mutually corresponding pixels of the plurality of original fingerprint images, and averages the accumulated results of the grey-scale values corresponding to the pixels to obtain an average image, and selects a plurality of grey-scale values higher than a first grey-scale value threshold or lower than a second grey-scale value threshold in the average image to obtain the current background noise.

4. The electronic device according to claim 1, wherein the image database comprises a plurality of original fingerprint image groups corresponding to the same fingerprint, and each of the plurality of original fingerprint image groups comprises one or more original fingerprint images corresponding to a same temperature condition.

5. An electronic device with a fingerprint sensing function, comprising:
    a processor;
    a fingerprint sensor, coupled to the processor for obtaining a current fingerprint image; and
    a temperature sensor, coupled to the processor for obtaining current temperature information,
    wherein the fingerprint sensor is an optical fingerprint sensor or a capacitive fingerprint sensor,
    wherein the processor obtains current background noise according to the current temperature information, and removes the background noise from the current fingerprint image according to the current background noise through image processing to generate a corrected fingerprint image,
    wherein the processor inputs default background noise and the current temperature information into a prediction model to obtain the current background noise corresponding to the current temperature information.

6. The electronic device according to claim 5, wherein the prediction model and the default background noise are stored in the memory.

7. A fingerprint image processing method, applied to an electronic device, the electronic device comprising a processor, a fingerprint sensor, and a temperature sensor, wherein the fingerprint sensor is an optical fingerprint sensor or a capacitive fingerprint sensor, wherein the fingerprint image processing method comprises:
    obtaining, by the fingerprint sensor, a current fingerprint image;
    obtaining, by the temperature sensor, current temperature information;
    obtaining, by the processor, current background noise according to the current temperature information, wherein the background noise is a noise image; and removing, by the processor, the background noise from the current fingerprint image according to the current background noise through image processing to generate a corrected fingerprint image, wherein the electronic device further comprises a memory, and the fingerprint image processing method further comprises:

storing, by the processor, the current fingerprint image to an image database of the memory, wherein the obtaining, by the processor, the current background noise according to the current temperature information comprises:

searching, by the processor, the image database according to the current temperature information; and obtaining, by the processor, when the processor determines that the number of a plurality of original fingerprint images stored in the image database corresponding to the current temperature information is greater than or equal to a predetermined number, the current background noise corresponding to the current temperature information according to the plurality of original fingerprint images.

8. The fingerprint image processing method according to claim 7, wherein the obtaining, by the processor, the current background noise corresponding to the current temperature information according to the plurality of original fingerprint images comprises:

performing, by the processor, image processing on the plurality of original fingerprint images to obtain the current background noise, wherein the image processing comprises grey-scale value accumulation, grey-scale value averaging, and grey-scale value selection.

9. The fingerprint image processing method according to claim 8, wherein the performing, by the processor, the image processing on the plurality of original fingerprint ages comprises:

accumulating, by the processor, grey-scale values of mutually corresponding pixels of e plurality of original fingerprint images;

averaging, by the processor, the accumulated results of the grey-scale values corresponding to the pixels to obtain an average image; and selecting, by the processor, a plurality of grey-scale values higher than a first grey-scale value threshold or lower than a second grey-scale value threshold in the average image to obtain the current background noise.

10. The fingerprint image processing method according to claim 7, wherein the image database comprises a plurality of original fingerprint image groups corresponding to the same fingerprint, and each of the plurality of original fingerprint image groups comprises one or more original fingerprint images corresponding to a same temperature condition.

11. A fingerprint image processing method, applied to an electronic device, the electronic device comprising a processor, a fingerprint sensor, and a temperature sensor, wherein the fingerprint sensor is an optical fingerprint sensor or a capacitive fingerprint sensor, wherein the fingerprint image processing method comprises:

obtaining, by the fingerprint sensor, a current fingerprint image;

obtaining, by the temperature sensor, current temperature information;

obtaining, by the processor, current background noise according to the current temperature information, wherein the background noise is a noise image; and removing, by the processor, the background noise from the current fingerprint image according to the current background noise through image processing to generate a corrected fingerprint image, wherein the obtaining, by the processor, the current background noise according to the current temperature information comprises:

inputting, by the processor, default background noise and the current temperature information into a prediction model to obtain the current background noise corresponding to the current temperature information.

12. The fingerprint image processing method according to claim 11, wherein the prediction model and the default background noise are stored in the memory.

* * * * *